United States Patent
Izumi

(10) Patent No.: US 9,307,187 B2
(45) Date of Patent: Apr. 5, 2016

(54) DISPLAY CONTROL DEVICE AND DISPLAY CONTROL METHOD

(71) Applicant: Panasonic Intellectual Property Management Co., Ltd., Osaka (JP)

(72) Inventor: Yoshiki Izumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/397,304

(22) PCT Filed: May 15, 2013

(86) PCT No.: PCT/JP2013/003104
§ 371 (c)(1),
(2) Date: Oct. 27, 2014

(87) PCT Pub. No.: WO2013/175735
PCT Pub. Date: Nov. 28, 2013

(65) Prior Publication Data
US 2015/0146097 A1   May 28, 2015

(30) Foreign Application Priority Data

May 22, 2012 (JP) ................................. 2012-116344

(51) Int. Cl.
| | |
|---|---|
| H04N 7/01 | (2006.01) |
| G09G 5/00 | (2006.01) |
| H04N 21/4402 | (2011.01) |
| G09G 3/36 | (2006.01) |
| H04N 5/445 | (2011.01) |
| H04N 5/45 | (2011.01) |

(52) U.S. Cl.
CPC ............... *H04N 7/013* (2013.01); *G09G 5/005* (2013.01); *H04N 7/0127* (2013.01); *H04N 7/0132* (2013.01); *H04N 21/440218* (2013.01);
(Continued)

(58) Field of Classification Search
None
See application file for complete search history.

(56) References Cited

U.S. PATENT DOCUMENTS

| | | | |
|---|---|---|---|
| 8,830,403 B1* | 9/2014 | Kametani | ............ H04N 7/013 348/441 |
| 2009/0059068 A1* | 3/2009 | Hanaoka | ................. G09G 3/20 348/459 |

(Continued)

FOREIGN PATENT DOCUMENTS

| | | |
|---|---|---|
| JP | 2003-280578 | 10/2003 |
| JP | 2010-35092 | 2/2010 |

(Continued)

OTHER PUBLICATIONS

International Search Report issued Aug. 20, 2013 in International (PCT) Application No. PCT/JP2013/003104.

*Primary Examiner* — Michael Teitelbaum

(74) *Attorney, Agent, or Firm* — Wenderoth, Lind & Ponack, L.L.P.

(57) ABSTRACT

A display control device includes a determining portion determining a frame rate in displaying a frame image on a display portion as a determined frame rate; and a converter converting a present frame rate into the determined frame rate when the determined frame rate is different from the present frame rate. The determining portion determines, based on information about an OSD image, whether the determined frame rate is set to a frame rate identical to or higher than the present frame rate, and when determining that the determined frame rate is set to the frame rate higher than the present frame rate, determines the frame rate as the determined frame rate to display the frame image at the determined frame rate starting from a frame image which is K frames after a currently displayed frame image, where K is an integer not less than 1 and not more than 10.

8 Claims, 11 Drawing Sheets

(52) U.S. Cl.
CPC ........ *G09G3/3648* (2013.01); *G09G 2320/103* (2013.01); *G09G 2330/021* (2013.01); *G09G 2340/0435* (2013.01); *G09G 2340/12* (2013.01); *G09G 2354/00* (2013.01); *H04N 5/44543* (2013.01); *H04N 5/45* (2013.01)

(56) References Cited

U.S. PATENT DOCUMENTS

2009/0059074 A1* 3/2009 Suematsu .......... H04N 5/44504 348/569
2011/0135114 A1* 6/2011 Oba .................. G06F 1/3203 381/107
2011/0285902 A1* 11/2011 Hoshino ............. H04N 7/013 348/441

FOREIGN PATENT DOCUMENTS

| JP | 2011-249866 | 12/2011 |
| WO | 2007/040045 | 4/2007 |
| WO | 2010/021373 | 2/2010 |

* cited by examiner

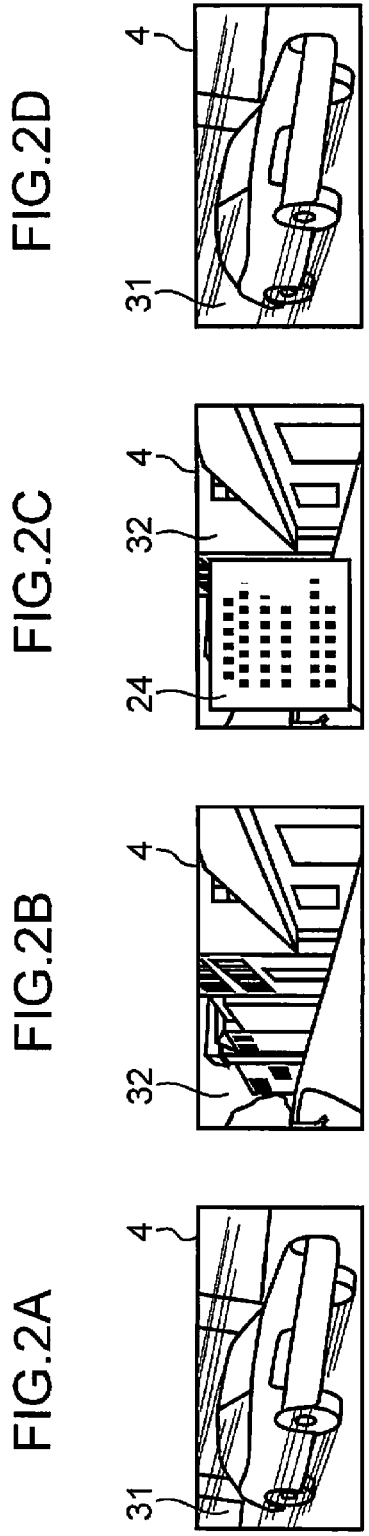

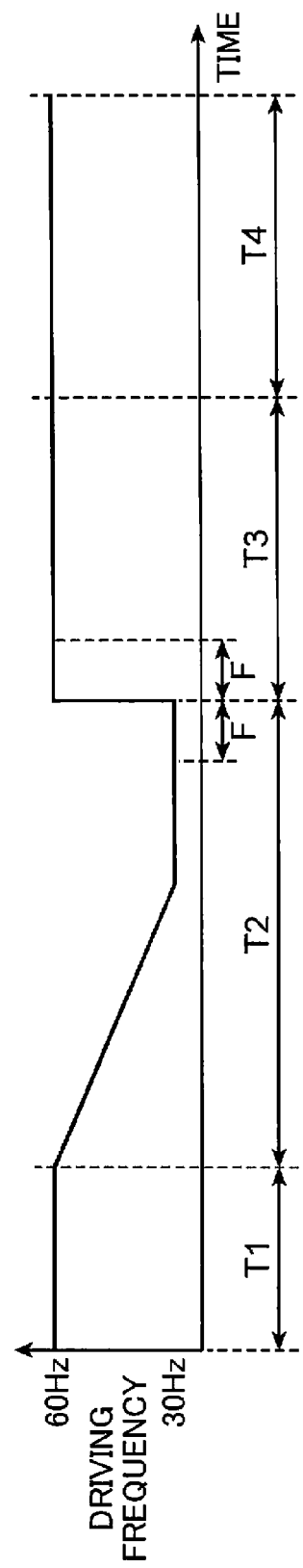

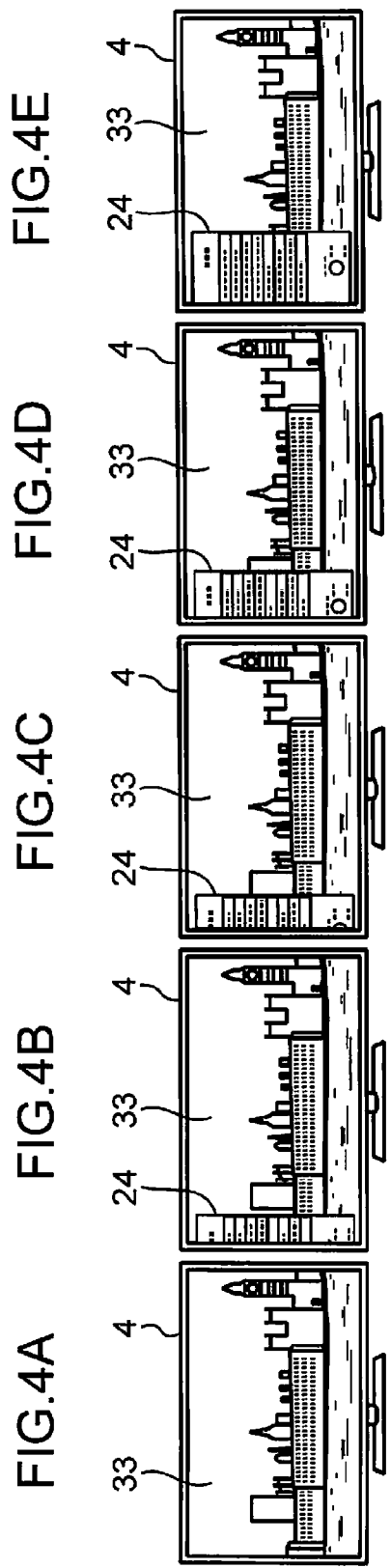

DISPLAY CONTROL DEVICE AND DISPLAY CONTROL METHOD

TECHNICAL FIELD

The present invention relates to a display control device and a display control method for controlling display on a display portion that displays frame images.

BACKGROUND ART

A display device including a display portion that displays frame images successively switches the frame images displayed on the display portion on the basis of, for example, an input image signal from the outside to display smooth images on the display portion. A frequency for switching the frame images is called frame rate, and 60 Hz is used in general. It has been known a display device that detects whether an input image signal is a signal representing a still image or a signal representing a moving image and switches a frame rate according to a detection result (see, for example, Patent Literature 1).

When the input image signal represents the still image, the device described in Patent Literature 1 reduces the frame rate to reduce power consumption during display. When the input image signal is switched between the still image and the moving image and the frame rate is increased or reduced, a predetermined time constant is given to the frame rate to prevent the frame rate from suddenly changing. Consequently, deterioration in display quality of an image is prevented.

Patent Literature 1 discloses that the device further performs on-screen display for superimposing and displaying a menu image or the like on an input image displayed on the display portion on the basis of the input image signal. However, when the frame rate is reduced, if a moving image is on-screen displayed and the frame rate is gradually increased, the on-screen display image does not smoothly move and moves at intervals and display quality of the on-screen display image is deteriorated.

CITATION LIST

Patent Literature

Patent Literature 1: Japanese Unexamined Patent Publication No. 2003-280578

SUMMARY OF INVENTION

The present invention has been devised in order to solve the problems described above and it is an object of the present invention to provide a display control device and a display control method capable of suppressing deterioration in display quality of an on-screen displayed image.

A display control device according to an aspect of the present invention is a display control device which controls display of a frame image on a display portion which displays the frame image, the frame image including an input image based on an input image signal and an OSD image for on-screen display, the display control device comprising: a determining portion which determines a frame rate in displaying the frame image on the display portion as a determined frame rate; and a converter which converts a present frame rate into the determined frame rate when the determined frame rate is different from the present frame rate, wherein the determining portion: acquires information about the OSD image; determines whether the determined frame rate is set to a frame rate identical to the present frame rate or a frame rate higher than the present frame rate, based on the acquired information about the OSD image; and when determining that the determined frame rate is set to the frame rate higher than the present frame rate, determines the frame rate as the determined frame rate to display the frame image on the display portion at the determined frame rate starting from a frame image which is K frames after a frame image currently displayed on the display portion, where K is an integer not less than 1 and not more than 10.

A display control method according to an aspect of the present invention is a display control method for controlling display of a frame image on a display portion which displays the frame image, the frame image including an input image based on an input image signal and an OSD image for on-screen display, the display control method comprising: a first step of determining a frame rate in displaying the frame image on the display portion as a determined frame rate; and a second step of converting a present frame rate into the determined frame rate when the determined frame rate is different from the present frame rate, wherein the first step includes: an acquiring step of acquiring information about the OSD image; and a determining step of determining whether the determined frame rate is set to a frame rate identical to the present frame rate or a frame rate higher than the present frame rate, based on the acquired information about the OSD image, and wherein in the first step, when it is determined in the determining step that the determined frame rate is set to the frame rate higher than the present frame rate, the frame rate is determined as the determined frame rate to display the frame image on the display portion at the determined frame rate starting from a frame image which is K frames after a frame image currently displayed on the display portion, where K is an integer not less than 1 and not more than 10.

According to the present invention, it is determined, based on the information about the OSD image, whether the determined frame rate is set to a frame rate identical to the present frame rate or a frame rate higher than the present frame rate. Therefore, the determined frame rate may be determined as a frame rate appropriate for the OSD image. When it is determined that the determined frame rate is set to a frame rate higher than the present frame rate, the frame rate is determined as the determined frame rate to display the frame image at the determined frame rate starting from a frame image that is K frames after the frame image currently displayed on the display portion, where K is an integer not less than 1 and not more than 10. Therefore, the OSD image is on-screen displayed on the display portion at the determined frame rate appropriate for the OSD image starting from the frame image which is K frames after the currently displayed frame image. As a result, deterioration in display quality of the OSD image may be suppressed.

BRIEF DESCRIPTION OF DRAWINGS

FIGS. 2A to 2D are diagrams schematically showing examples of frame images displayed on a liquid crystal panel.

FIG. 3 is a timing chart schematically showing driving frequencies when the frame images in FIGS. 2A to 2D are displayed.

FIGS. 4A to 4E are schematic diagrams showing, in order, states in which an OSD image slides and is gradually on-screen displayed on a liquid crystal panel on which a still image is displayed in this embodiment.

DESCRIPTION OF EMBODIMENTS (First Embodiment)

Figure 1:
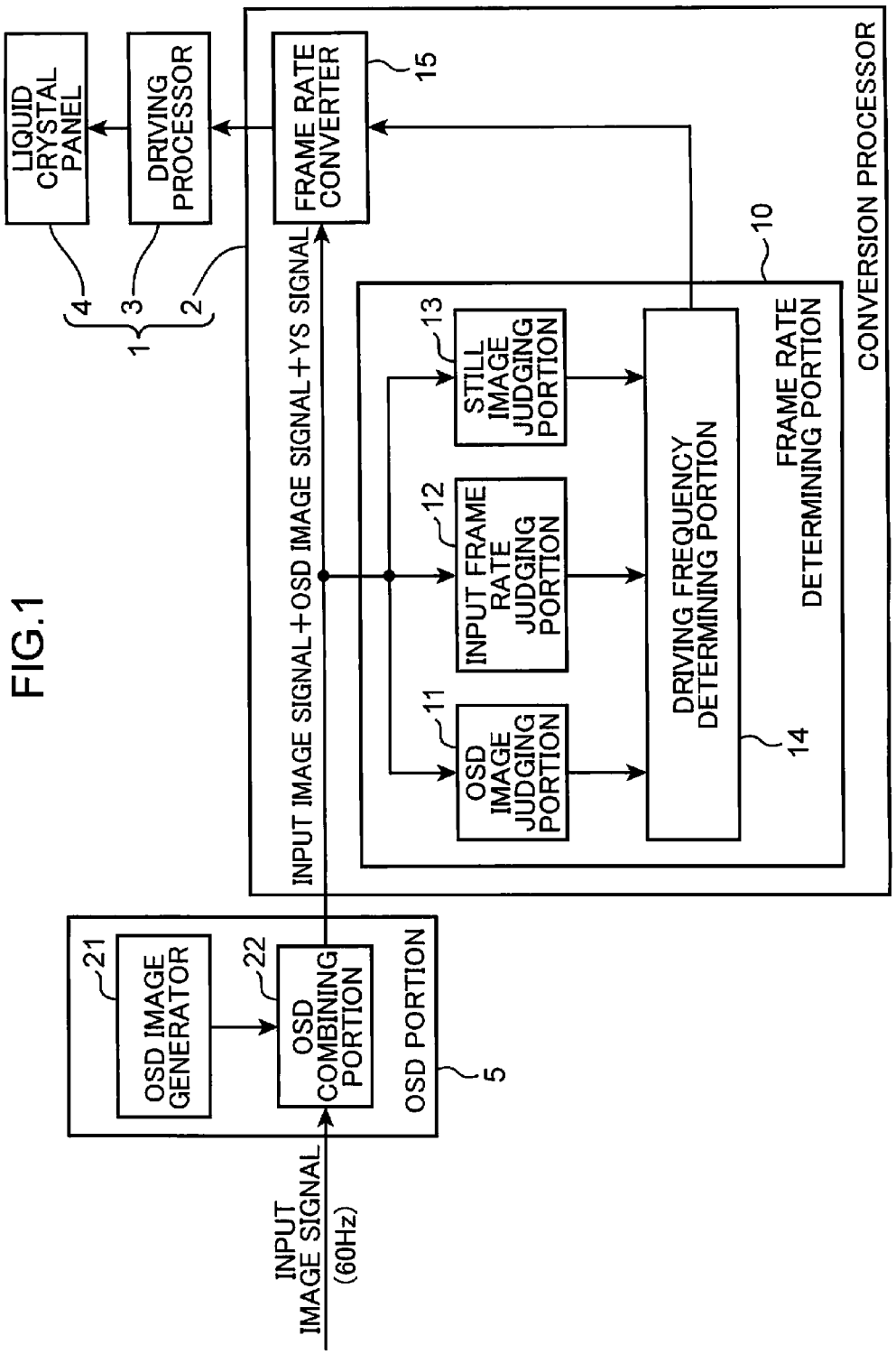
FIG. 1 is a block diagram showing a configuration of a display device including the first embodiment of a display control device and a configuration of an on-screen display portion.

FIG. 1 is a block diagram of a configuration of a display device including the first embodiment of a display control device and a configuration of an on-screen display portion (OSD portion). A display device 1 shown in FIG. 1 includes a conversion processor 2, which is the first embodiment of the display control device, a driving processor 3, and a liquid crystal panel (a display portion) 4. An OSD portion 5 shown in FIG. 1 includes an on-screen display (OSD) image generator 21 and an on-screen display (OSD) combining portion 22.

Although not shown in the figure, the liquid crystal panel 4 includes gate lines extending in the horizontal direction, source lines extending in the vertical direction, switching elements, and pixels. The switching elements and the pixels are arranged in a matrix at intersections of the source lines and the gate lines. One scanning line is configured from pixels in one line in the horizontal direction.

Driving signals corresponding to the pixels are supplied to the source lines from the driving processor 3. Gate pulses serving as scanning signals are supplied to the gate lines from the driving processor 3. Signal voltages are applied to liquid crystal layers corresponding to the pixels to control transmittance of the pixels. Consequently, an input image based on an input image signal is displayed on the liquid crystal panel 4. As the liquid crystal panel 4, an IPS (In Plane Switching) system, a VA (Vertical Alignment) system, and any other systems may be applied.

The OSD image generator 21 generates, at a predetermined frame rate (in this embodiment, 60 Hz), an on-screen display (OSD) image 24 (FIG. 2C) which is on-screen displayed on the liquid crystal panel 4. The OSD image 24 is, for example, a menu image. The OSD combining portion 22 combines the OSD image 24 generated by the OSD image generator 21 with an input image signal from the outside. An image signal represents a frame image generated for each frame. In this embodiment, the image signal is input at a frame rate of 60 Hz.

The OSD combining portion 22 generates a YS signal indicating a display region in the liquid crystal panel 4 of the OSD image 24. The YS signal is a signal for indicating for each of the pixels of the liquid crystal panel 4 whether the OSD image 24 is displayed, for example, with the pixels for displaying the OSD image 24 represented as "1" and the pixels for not displaying the OSD image 24 represented as "0" among the pixels of the liquid crystal panel 4. The OSD combining portion 22 outputs the input image signal and the OSD image signal combined with each other and the generated YS signal to the conversion processor 2 of the display device 1.

The conversion processor 2 includes a frame rate determining portion 10 and a frame rate converter 15. The frame rate determining portion 10 includes an on-screen display (OSD) image judging portion 11, an input frame rate judging portion 12, a still image judging portion 13, and a driving frequency determining portion 14.

The OSD image judging portion 11 judges, on the basis of the YS signal input from the OSD combining portion 22, whether or not the OSD image 24 is a moving image. The OSD image judging portion 11 compares YS signals, for example, among different frames and, if a pixel indicating "1" of the YS signal is moving, judges that the OSD image 24 is a moving image. The OSD image judging portion 11 further judges a frame rate of the OSD image 24 on the basis of the YS signal output from the OSD combining portion 22. For example, if the YS signal is changing at every two frames, the OSD image judging portion 11 judges that the frame rate of the OSD image 24 is a half of the frame rate (in this embodiment, 60 Hz) of the input image signal (i.e., 30 Hz). The OSD image judging portion 11 outputs signals indicating respective judgment results to the driving frequency determining portion 14. When all the YS signals are "0", the OSD image judging portion 11 judges that an OSD image is not combined with the input image signal and outputs a signal indicating to that effect to the driving frequency determining portion 14.

The input frame rate judging portion 12 judges a frame rate of the input image signal. The input frame rate judging portion 12 outputs a signal indicating a judgment result of the frame rate to the driving frequency determining portion 14. In this embodiment, the input frame rate judging portion 12 judges that the frame rate of the input image signal is 60 Hz and outputs a signal indicating that the frame rate of the input image signal is 60 Hz to the driving frequency determining portion 14.

The still image judging portion 13 judges, on the basis of the input image signal, whether or not the input image signal represents a still image. For example, the still image judging portion 13 compares the input image signal among different frames for each of the pixels and judges whether the input image signal represents a still image or a moving image. The still image judging portion 13 outputs a signal indicating a judgment result to the driving frequency determining portion 14.

The driving frequency determining portion 14 determines a frame rate in displaying a frame image on the liquid crystal panel 4 as a determined frame rate on the basis of the signals respectively output from the OSD image judging portion 11, the input frame rate judging portion 12, and the still image judging portion 13. The driving frequency determining portion 14 outputs a signal indicating the determined frame rate to the frame rate converter 15.

First, the driving frequency determining portion 14 determines, as the determined frame rate, a frame rate indicated by the signal output from the input frame rate judging portion 12. For example, if the frame rate of the input image signal is 60

Hz, the driving frequency determining portion 14 determines 60 Hz as the determined frame rate. If the frame rate of the input image signal is 15 Hz, the driving frequency determining portion 14 determines 15 Hz as the determined frame rate. In this embodiment, the frame rate of the input image signal is set to 60 Hz, as described above.

When a signal indicating that the input image signal represents a moving image is output from the still image judging portion 13, the driving frequency determining portion 14 determines the frame rate (in this embodiment, 60 Hz) of the input image signal as the determined frame rate. When a signal indicating that the input image signal represents a still image is output from the still image judging portion 13, in order to reduce power consumption, the driving frequency determining portion 14 determines a reduced frame rate as the determined frame rate. In this embodiment, the driving frequency determining portion 14 determines the frame rate as 30 Hz. When the image represented by the input image signal is switched between the moving image and the still image, the driving frequency determining portion 14 determines a frame rate to gradually change in frames.

When the frame rate is determined, for example, as 30 Hz because the input image signal represents the still image, if the signal indicating that the frame rate of the on-screen displayed OSD image is 60 Hz and the OSD image is the moving image is output from the OSD image judging portion 11, the driving frequency determining portion 14 increases the frame rate of 30 Hz and determines 60 Hz as the determined frame rate. In this case, the driving frequency determining portion 14 instantaneously switches the determined frame rate to display the frame image at the frame rate of 60 Hz starting from the next frame image of the frame image currently displayed on the liquid crystal panel 4.

The frame rate converter 15 converts the present frame rate into the determined frame rate determined by the driving frequency determining portion 14. When the converted frame rate is different from the frame rate (in this embodiment, 60 Hz) of the input image signal, the frame rate converter 15 interpolates frame images and generates an interpolated frame image according to the converted frame rate. The frame rate converter 15 outputs signals representing frame images including the generated interpolated frame image to the driving processor 3. The driving processor 3 generates driving signals for driving the pixels of the liquid crystal panel 4, on the basis of the signals output from the frame rate converter 15. The driving processor 3 outputs the generated driving signals to the liquid crystal panel 4. In this embodiment, the frame rate determining portion 10 is exemplified as the determining portion, the frame rate converter 15 is exemplified as the converter, and the YS signal is exemplified as the OSD signal.

FIGS. 2A to 2D are diagrams schematically showing examples of frame images displayed on the liquid crystal panel 4. FIG. 2A shows the liquid crystal panel 4 on which a moving image 31 is displayed as an input image based on an input image signal. FIG. 2B shows the liquid crystal panel 4 on which a still image 32 is displayed as an input image based on an input image signal. FIG. 2C shows the liquid crystal panel 4 on which the moving OSD image 24 of 60 Hz is on-screen displayed on the still image 32 of FIG. 2B. FIG. 2D shows the liquid crystal panel 4 on which the moving image 31 is displayed. FIG. 3 is a timing chart schematically showing driving frequencies (frame rates) when the frame images in FIGS. 2A to 2D are displayed. In FIG. 3, a period is divided into periods T1 to T4 in order according to the frame images displayed on the liquid crystal panel 4. The operation of the conversion processor 2 shown in FIG. 1 is described with reference to FIG. 1 to FIG. 3.

In FIG. 3, in the first period T1, the moving image 31 shown in FIG. 2A is displayed on the liquid crystal panel 4. In this case, the driving frequency determining portion 14 determines 60 Hz as the determined frame rate. In this embodiment, since the frame rate of the input image signal is 60 Hz, the frame rate converter 15 generates the signal representing the input image based on the input image signal and outputs the signal to the driving processor 3. In the period T1, as shown in FIG. 3, the frame rate is maintained at 60 Hz.

In the period T2 following the period T1, the still image 32 shown in FIG. 2B is displayed on the liquid crystal panel 4. In this case, in order to reduce power consumption, the driving frequency determining portion 14 determines 30 Hz as the determined frame rate. In order to cause little flicker in a displayed image, the driving frequency determining portion 14 determines the frame rate to gradually decrease over frames from 60 Hz to 30 Hz as shown in FIG. 3. The frame rate converter 15 generates, according to the frame rate determined to gradually decrease by the driving frequency determining portion 14, a signal representing the interpolated frame image obtained by curtailing and interpolating the input image signals and outputs the signal to the driving processor 3. Therefore, in the period T2, as shown in FIG. 3, the frame rate gradually decreases from 60 Hz. When decreasing to 30 Hz, the frame rate is maintained at 30 Hz.

In the period T3 following the period T2, as shown in FIG. 2C, the moving OSD image 24 at 60 Hz of the frame rate, is on-screen displayed on the liquid crystal panel 4 in addition to the still image 32 shown in FIG. 2B. In this case, the driving frequency determining portion 14 determines 60 Hz as the determined frame rate. The driving frequency determining portion 14 instantaneously increases the frame rate without gradually increasing the frame rate. That is, as shown in FIG. 3, the driving frequency determining portion 14 determines the frame rate as 60 Hz in a first frame F in the period T3 following a last frame F in the period T2. In this embodiment, since the frame rate of the input image signal is 60 Hz, the frame rate converter 15 generates a signal representing the frame image including the input image based on the input image signal and the OSD image 24 and outputs the signal to the driving processor 3. In the period T3, as shown in FIG. 3, the frame rate is maintained at 60 Hz.

In the period T4 following the period T3, the moving image 31 shown in FIG. 2D is displayed on the liquid crystal panel 4. In this case, the driving frequency determining portion 14 determines 60 Hz as the determined frame rate. Like the period T1, the frame rate converter 15 generates a signal representing the input image based on the input image signal and outputs the signal to the driving processor 3. In the period T4, as shown in FIG. 3, the frame rate is maintained at 60 Hz.

Figure 5C:
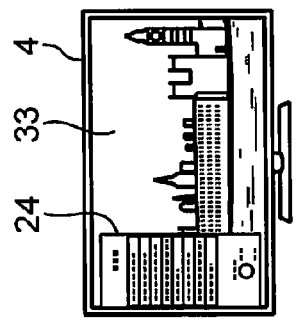
FIGS. 5A to 5C are schematic diagrams showing, in order, states in which the OSD image slides and is gradually on-screen displayed on the liquid crystal panel on which a still image is displayed in a comparative example in which a frame rate gradually increases.
Figure 5B:
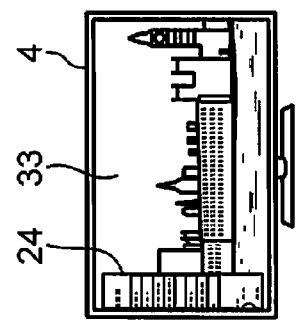
Figure 5A:
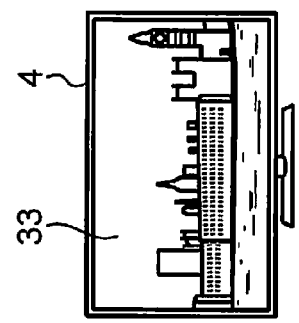

FIGS. 4A to 4E are schematic diagrams showing, in order, states in which the OSD image 24 slides and is gradually on-screen displayed on the liquid crystal panel 4 on which a still image 33 is displayed in this embodiment. FIGS. 5A to 5C are schematic diagrams showing, in order, states in which the OSD image 24 slides and is gradually on-screen displayed on the liquid crystal panel 4 on which the still image 33 is displayed in a comparative example in which the frame rate gradually increases. Effects of this embodiment are described with reference to FIG. 4 and FIG. 5.

FIG. 4A shows the liquid crystal panel 4 on which the still image 33 is displayed. In this case, the frame rate is set to 30 Hz, as described above. In this state, as shown in FIG. 4B, when the OSD image 24 slides and is on-screen displayed, the frame rate is changed to 60 Hz instantaneously (namely, from the next frame image), as described above. As a result, as shown in FIGS. 4B to 4E, the OSD image 24 smoothly slides and is on-screen displayed.

On the other hand, FIG. 5A shows the liquid crystal panel 4 on which the still image 33 is displayed, as in FIG. 4A. In this case, the frame rate is set to 30 Hz, as described above. In this state, as shown in FIG. 5B, when the OSD image 24 slides and is on-screen displayed, in the comparative example, the frame rate gradually increases. Therefore, as shown in FIGS. 5B and 5C, halfway images fall off. That is, a frame image equivalent to FIG. 4B is absent between FIG. 5A and FIG. 5B. Moreover, a frame image equivalent to FIG. 4D is absent between FIG. 5B and FIG. 5C. As a result, the OSD image 24 does not smoothly slide and is formed as a moving image that moves at intervals and on-screen displayed on the liquid crystal panel 4.

As described above, in the first embodiment, for example, when the still image is displayed on the liquid crystal panel 4 and the frame rate decreases to 30 Hz, and if the moving OSD image of 60 Hz is on-screen displayed, the frame rate instantaneously increases to 60 Hz and the OSD image is displayed at the frame rate of 60 Hz starting from the next frame image. Therefore, according to the first embodiment, a smoothly moving OSD image may be on-screen displayed. As a result, an OSD image as intended by a creator, who creates the OSD image generator 21, may be displayed on the liquid crystal panel 4.

(Second Embodiment)

Figure 6:
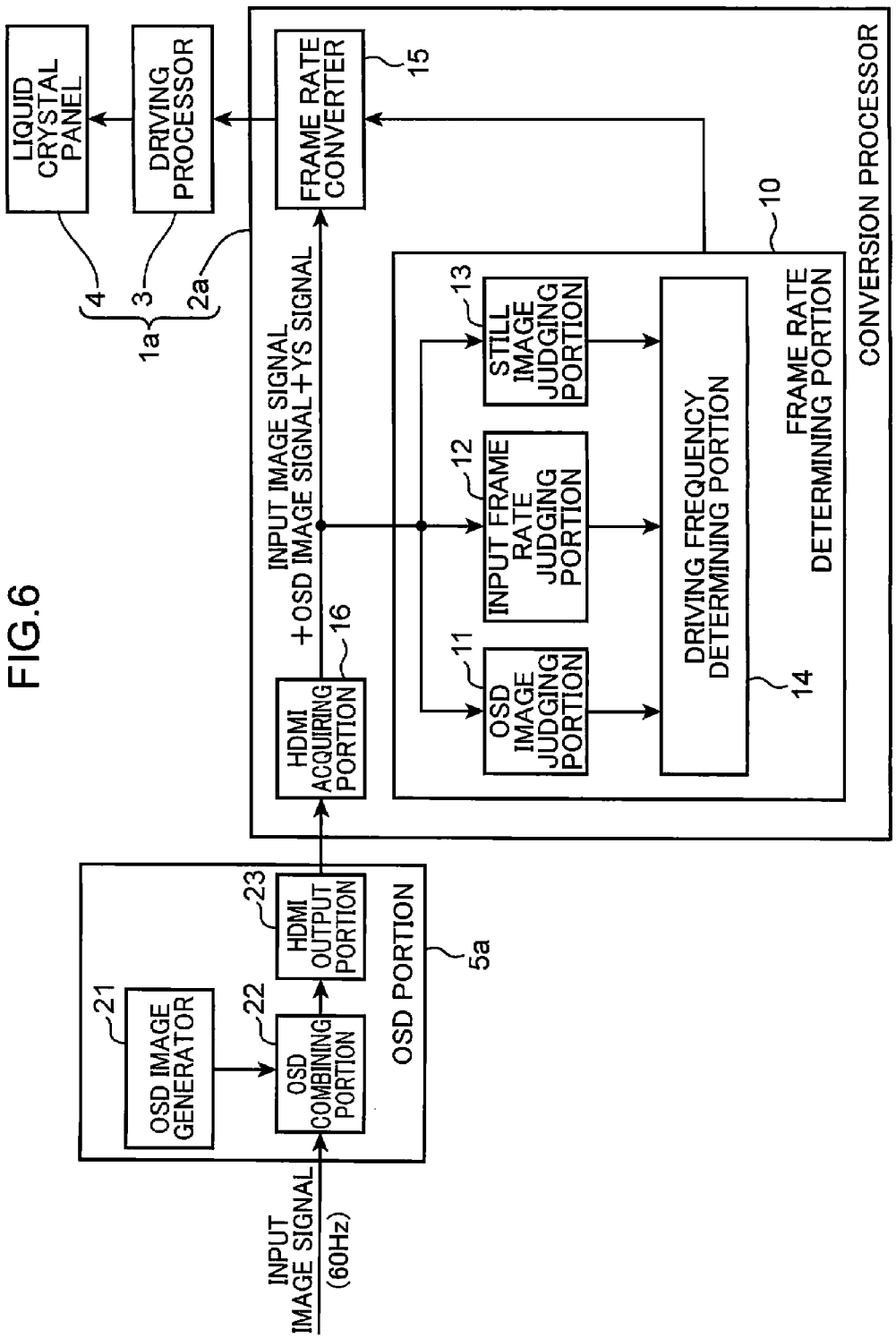
FIG. 6 is a block diagram showing a configuration of a display device including the second embodiment of the display control device and a configuration of an OSD portion.

FIG. 6 is a block diagram showing a configuration of a display device including the second embodiment of the display control device and a configuration of an OSD portion. In FIG. 6, the same components as the components shown in FIG. 1 are denoted by the same reference symbols. A display device 1a shown in FIG. 6 includes a conversion processor 2a, which is the second embodiment of the display control device, instead of the conversion processor 2 in the display device 1 shown in FIG. 1. In the following description of the second embodiment, differences from the first embodiment are mainly described.

As shown in FIG. 6, the conversion processor 2a includes a high definition multimedia interface (HDMI) acquiring portion 16 in addition to the frame rate determining portion 10 and the frame rate converter 15 included in the conversion processor 2 shown in FIG. 1. An OSD portion 5a shown in FIG. 6 includes an HDMI output portion 23 in addition to the OSD image generator 21 and the OSD combining portion 22 included in the OSD portion 5 shown in FIG. 1. In the second embodiment, the OSD portion 5a and the conversion processor 2a are connected by an HDMI (registered trademark), which is a type of a digital interface.

The HDMI output portion 23 of the OSD portion 5a outputs, according to an HDMI standard, an HDMI signal including an image signal obtained by combining an input image signal and an OSD image signal and a YS signal to the conversion processor 2a. The HDMI acquiring portion 16 of the conversion processor 2a acquires the HDMI signal output from the HDMI output portion 23 and distinguishes and outputs the image signal obtained by combining the input image signal and the OSD image signal and the YS signal. The other components are the same as the components in the first embodiment shown in FIG. 1. In this embodiment, the frame rate determining portion 10 is exemplified as the determining portion. The frame rate converter 15 is exemplified as the converter. In the second embodiment, the operation is the same as the operation in the first embodiment and effects the same as the effects in the first embodiment may be obtained.

(Third Embodiment)

Figure 7:
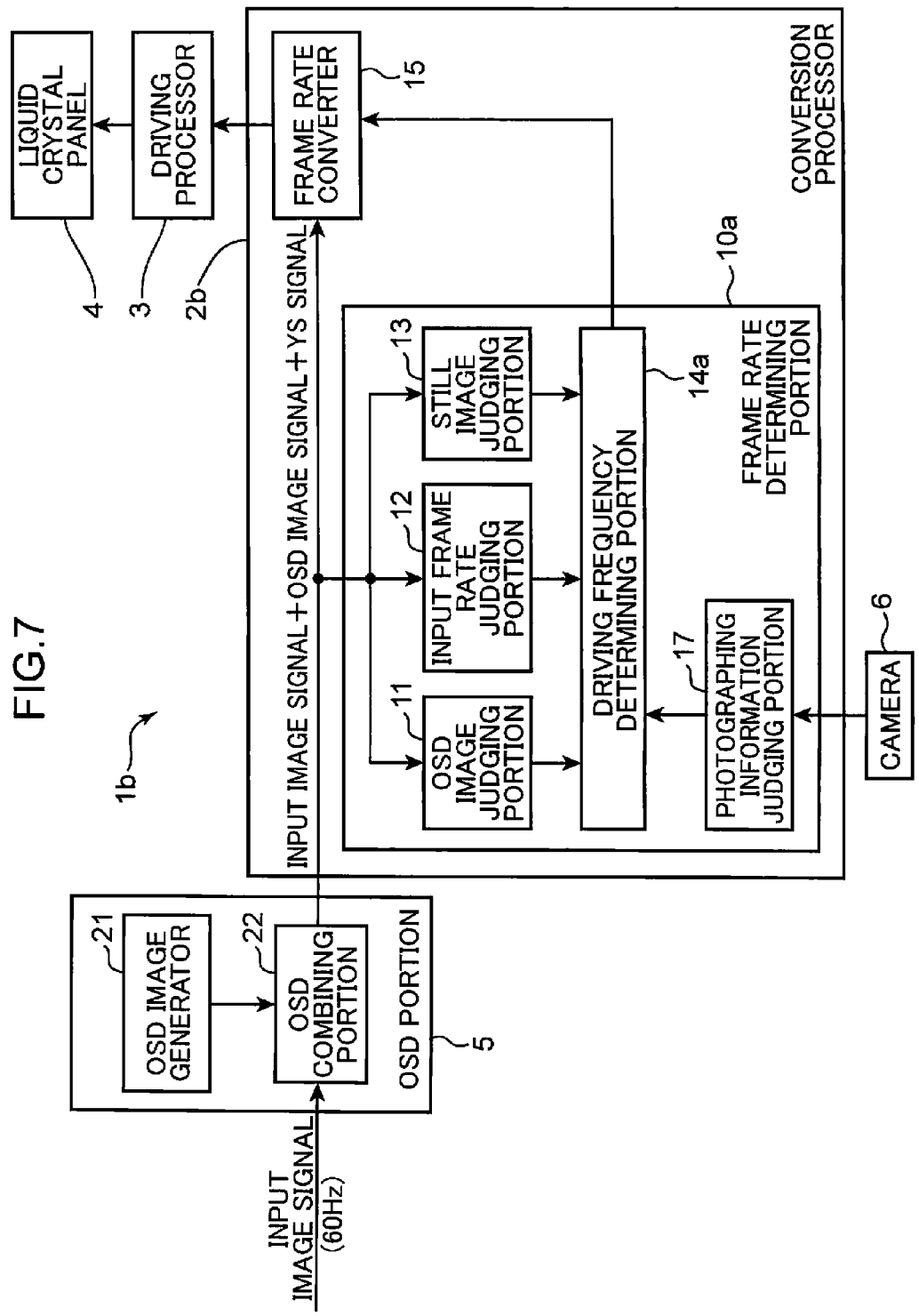
FIG. 7 is a block diagram showing a configuration of a display device including the third embodiment of the display control device and a configuration of an OSD portion.

FIG. 7 is a block diagram showing a configuration of a display device including the third embodiment of the display control device and a configuration of an OSD portion. In FIG. 7, the same components as the components shown in FIG. 1 are denoted by the same reference symbols. A display device 1b shown in FIG. 7 includes a conversion processor 2b, which is the third embodiment of the display control device, instead of the conversion processor 2 in the display device 1 shown in FIG. 1 and further includes a camera 6. In the following description of the third embodiment, differences from the first embodiment are mainly described.

As shown in FIG. 7, the conversion processor 2b includes a frame rate determining portion 10a instead of the frame rate determining portion 10 included in the conversion processor 2 shown in FIG. 1. The frame rate determining portion 10a includes a driving frequency determining portion 14a instead of the driving frequency determining portion 14 in the frame rate determining portion 10 shown in FIG. 1 and further includes a photographing information judging portion 17.

The camera 6 photographs the front of the liquid crystal panel 4 and detects a face of a viewer viewing an image displayed on the liquid crystal panel 4. The camera 6 outputs face detection information obtained by the photographing to the photographing information judging portion 17 of the conversion processor 2b. The photographing information judging portion 17 judges, on the basis of the face detection information output from the camera 6, whether or not viewing the image displayed on the liquid crystal panel 4 is main activity of the viewer. For example, when the time during which the viewer does not keep an eye on the liquid crystal panel 4 continues for 10 seconds, the photographing information judging portion 17 judges that viewing the image displayed on the liquid crystal panel 4 is not the main activity of the viewer. For example, when the distance of the viewer from the liquid crystal panel 4 exceeds 5 meters, the photographing information judging portion 17 judges that viewing the image displayed on the liquid crystal panel 4 is not the main activity of the viewer. The photographing information judging portion 17 outputs a judgment result to the driving frequency determining portion 14a.

In addition to the function of the driving frequency determining portion 14 shown in FIG. 1, the driving frequency determining portion 14a determines a frame rate on the basis of the judgment result output from the photographing information judging portion 17. That is, when the photographing information judging portion 17 judges that viewing the image displayed on the liquid crystal panel 4 is not the main activity of the viewer, the driving frequency determining portion 14a determines to maintain the present frame rate without increasing the frame rate irrespective of other information. For example, in a state in which a still image is displayed on the liquid crystal panel 4 and the frame rate is set to 30 Hz, even if a signal indicating that a moving OSD image at a frame rate of 60 Hz is on-screen displayed on the liquid crystal panel 4 is output from the OSD image judging portion 11, the driving frequency determining portion 14a maintains the frame rate at 30 Hz without increasing the frame rate to 60 Hz. In this embodiment, the frame rate determining portion 10a is exemplified as the determining portion, the frame rate converter 15 is exemplified as the converter, and the camera 6 is exemplified as the photographing portion.

As described above, in the third embodiment, when it is determined that viewing the displayed image on the liquid crystal panel 4 is not the main activity of the viewer, in a state in which the frame rate decreases to 30 Hz, even if the moving OSD image at the frame rate of 60 Hz is on-screen displayed, the frame rate is not increased to 60 Hz and is maintained at 30 Hz. That is, in the third embodiment, the moving OSD image may be displayed on the liquid crystal panel 4 while moving at intervals. As a result, in the third embodiment, the display device 1b may give priority to a reduction in power consumption.

(Fourth Embodiment)

Figure 8:
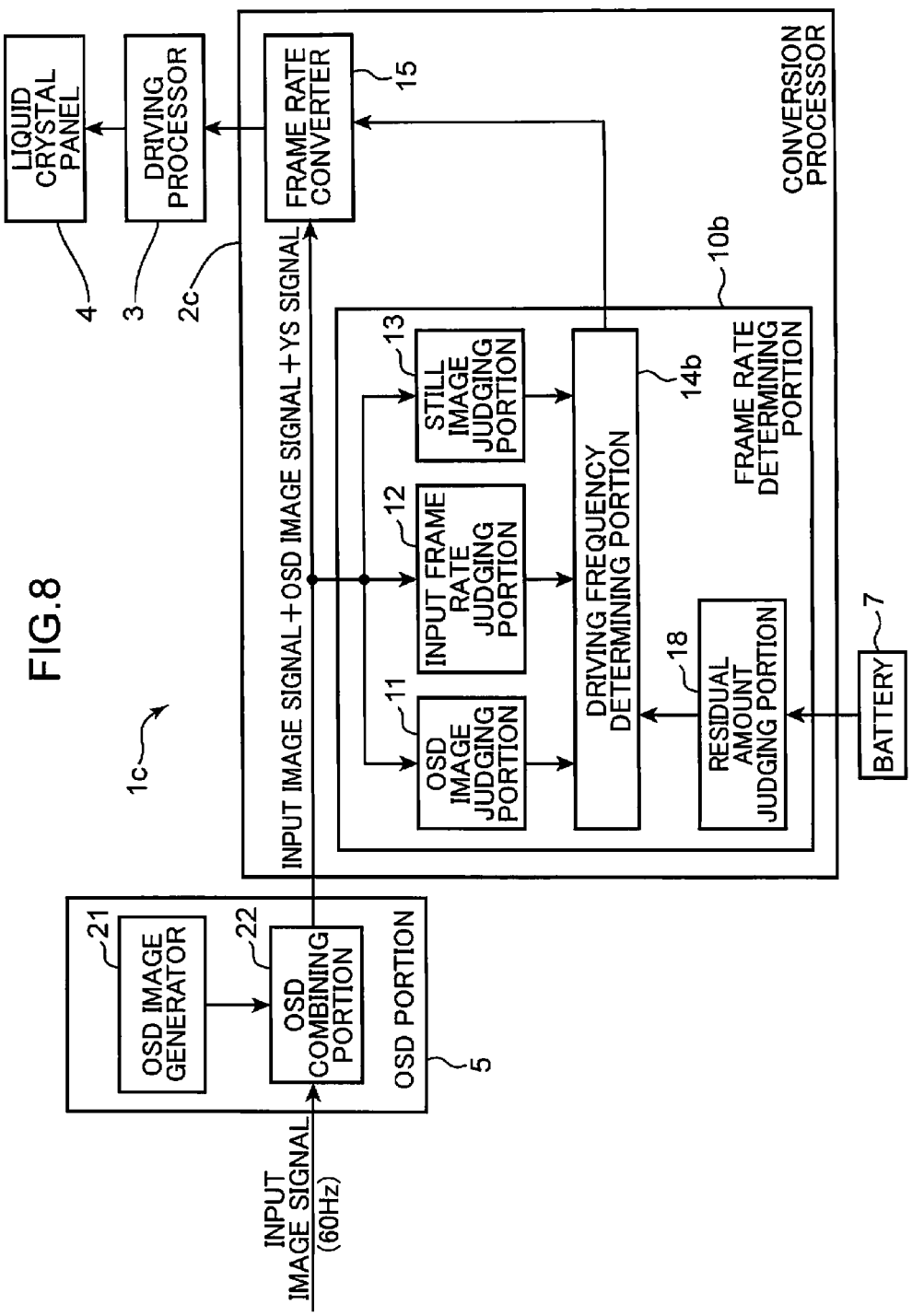
FIG. 8 is a block diagram showing a configuration of a display device including the fourth embodiment of the display control device and a configuration of an OSD portion.

FIG. 8 is a block diagram showing a configuration of a display device including the fourth embodiment of the display control device and a configuration of an OSD portion. In FIG. 8, the same components as the components shown in FIG. 1 are denoted by the same reference symbols. A display device 1c shown in FIG. 8 includes a conversion processor 2c, which is the fourth embodiment of the display control device, instead of the conversion processor 2 in the display device 1 shown in FIG. 1 and further includes a battery 7. In the following description of the fourth embodiment, differences from the first embodiment are mainly described.

As shown in FIG. 8, the conversion processor 2c includes a frame rate determining portion 10b instead of the frame rate determining portion 10 included in the conversion processor 2 shown in FIG. 1. The frame rate determining portion 10b includes a driving frequency determining portion 14b instead of the driving frequency determining portion 14 in the frame rate determining portion 10 shown in FIG. 1 and further includes a residual amount judging portion 18.

The battery 7 supplies electric power to respective portions of the display device 1c including the conversion processor 2c. The battery 7 outputs a signal representing information about a residual amount of the battery 7 to the residual amount judging portion 18 of the conversion processor 2c. The residual amount judging portion 18 judges, on the basis of the signal representing the information about the residual amount of the battery 7 output from the battery 7, whether or not the residual amount of the battery 7 is sufficient. That is, for example, when the residual amount of the battery 7 is not more than 10%, the residual amount judging portion 18 judges that the residual amount of the battery 7 is insufficient. For example, when it is predicted that the residual amount of the battery 7 decreases to zero in one hour if the present residual amount decrease degree continues, the residual amount judging portion 18 judges that the residual amount of the battery 7 is insufficient. The residual amount judging portion 18 outputs a judgment result to the driving frequency determining portion 14b.

In addition to the function of the driving frequency determining portion 14 shown in FIG. 1, the driving frequency determining portion 14b determines the frame rate as the determined frame rate on the basis of the judgment result output from the residual amount judging portion 18. That is, when the residual amount judging portion 18 judges that the residual amount of the battery 7 is insufficient, the driving frequency determining portion 14b determines the present frame rate as the determined frame rate without increasing the frame rate. For example, in a state in which a still image is displayed on the liquid crystal panel 4 and the frame rate is set to 30 Hz, even if a signal indicating that a moving OSD image at a frame rate of 60 Hz is on-screen displayed on the liquid crystal panel 4 is output from the OSD image judging portion 11, when the residual amount judging portion 18 determines that the residual amount of the battery 7 is insufficient, the driving frequency determining portion 14b determines 30 Hz as the determined frame rate without increasing the frame rate to 60 Hz. In this embodiment, the frame rate determining portion 10b is exemplified as the determining portion and the frame rate converter 15 is exemplified as the converter.

As described above, in the fourth embodiment, when it is determined that the residual amount of the battery 7 is insufficient, in a state in which the frame rate is decreased to 30 Hz, even if the moving OSD image at the frame rate of 60 Hz is on-screen displayed, the frame rate is not increased to 60 Hz and is maintained at 30 Hz. That is, in the fourth embodiment, the moving OSD image is allowed to be displayed on the liquid crystal panel 4 while moving at intervals. As a result, in the fourth embodiment, the display device 1c may give priority to a reduction in power consumption.

(Fifth Embodiment)

Figure 9:
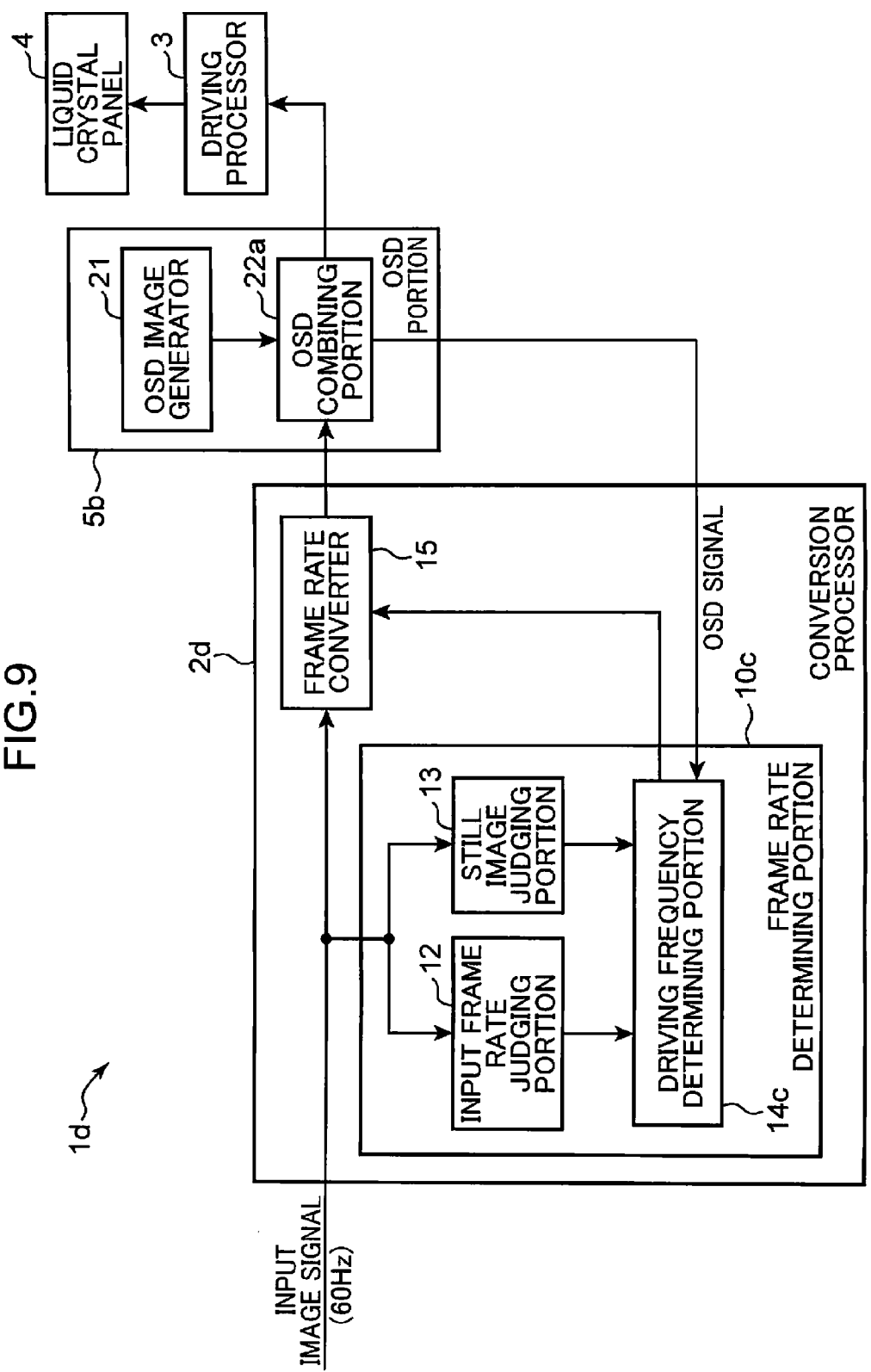
FIG. 9 is a block diagram showing a configuration of a display device including the fifth embodiment of the display control device and a configuration of an OSD portion.

FIG. 9 is a block diagram showing a configuration of a display device including the fifth embodiment of the display control device. In FIG. 9, the same components as the components shown in FIG. 1 are denoted by the same reference symbols. A display device 1d shown in FIG. 9 includes a conversion processor 2d, which is the fifth embodiment of the display control device, instead of the conversion processor 2 in the display device 1 shown in FIG. 1 and further includes an OSD portion 5b anew. In the following description of the fifth embodiment, differences from the first embodiment are mainly described.

In the first to fourth embodiments, the OSD image signal is combined with the input image signal in the pre-stages of the conversion processors 2 and 2a to 2c. On the other hand, in the fifth embodiment, as shown in FIG. 9, the display device 1d includes the OSD portion 5b. The OSD image signal is combined with the input image signal in a post-stage of the conversion processor 2d.

As shown in FIG. 9, the conversion processor 2d includes a frame rate determining portion 10c instead of the frame rate determining portion 10 included in the conversion processor 2 shown in FIG. 1. The frame rate determining portion 10c includes a driving frequency determining portion 14c instead of the driving frequency determining portion 14 in the frame rate determining portion 10 shown in FIG. 1 and does not include an OSD image judging portion.

The OSD portion 5b includes an OSD image generator 21 and an OSD combining portion 22a. The OSD combining portion 22a combines an OSD image generated by the OSD image generator 21 with the image signal output from the frame rate converter 15 of the conversion processor 2d. The OSD combining portion 22a outputs an OSD signal indicating a frame rate and presence or absence of movement of the OSD image generated by the OSD image generator 21 to the driving frequency determining portion 14c of the conversion processor 2d.

The driving frequency determining portion 14c determines, on the basis of the signals respectively output from the input frame rate judging portion 12, the still image judging portion 13, and the OSD combining portion 22a, a frame rate in displaying a frame image on the liquid crystal panel 4 as a determined frame rate. The driving frequency determining portion 14c determines, as the determined frame rate, a frame rate indicated by the signal output from the input frame rate judging portion 12. For example, if a frame rate of an input image signal is 60 Hz, the driving frequency determining portion 14c determines 60 Hz as the determined frame rate. If the frame rate of the input image signal is 15 Hz, the driving frequency determining portion 14c determines 15 Hz as the determined frame rate. In the fifth embodiment, as in the first embodiment, the frame rate of the input image signal is set to 60 Hz.

When a signal indicating that the input image signal represents a moving image is output from the still image judging portion 13, the driving frequency determining portion 14c determines the frame rate (in this embodiment, 60 Hz) of the input image signal as the determined frame rate. When a signal indicating that the input image signal represents a still image is output from the still image judging portion 13, in order to reduce power consumption, the driving frequency determining portion 14c determines a reduced frame rate as the determined frame rate. In this embodiment, as the reduced frame rate, the driving frequency determining portion 14c determines, for example, 30 Hz as the determined frame rate. When the image represented by the input image signal is switched between the moving image and the still image, the driving frequency determining portion 14c determines a frame rate to gradually change in frames.

When an OSD signal indicating that a frame rate of an on-screen displayed OSD image is 60 Hz and that the OSD image is a moving image is output from the OSD combining portion 22a, if the present frame rate is lower than the frame rate of the OSD image, the driving frequency determining portion 14c increases the present frame rate (e.g., 30 Hz) and determines the frame rate (in this embodiment, 60 Hz) of the OSD image as the determined frame rate. In this case, the driving frequency determining portion 14c instantaneously switches the determined frame rate to display the frame image at the frame rate of 60 Hz starting from the next frame image. The driving frequency determining portion 14c outputs a signal indicating the determined frame rate to the frame rate converter 15. In this embodiment, the frame rate determining portion 10c is exemplified as the determining portion and the frame rate converter 15 is exemplified as the converter.

As described above, in the fifth embodiment, when the OSD signal output from the OSD combining portion 22a indicates that the frame rate of the on-screen displayed OSD image is higher than the present frame rate and the OSD image is the moving image, the driving frequency determining portion 14c increases the present frame rate, determines the frame rate of the OSD image as the determined frame rate, and instantaneously switches the determined frame rate. Therefore, an image obtained by on-screen displaying the OSD image on the image represented by the input image signal is displayed on the liquid crystal panel 4 at the frame rate of the OSD image starting from the next frame image. As a result, in the fifth embodiment, as in the first embodiment, a smoothly moving OSD image may be on-screen displayed on the liquid crystal panel 4.

(Sixth Embodiment)

In the conversion processor 2 in the first embodiment, when the present frame rate is 30 Hz, if the moving OSD image generated at the frame rate of 60 Hz is combined, the driving frequency determining portion 14 increases the frame rate and determines 60 Hz, which is the frame rate of the OSD image, as the determined frame rate. However, the conversion processor is not limited to this and may increase the frame rate to a frame rate higher than the frame rate of the OSD image.

Figure 10:
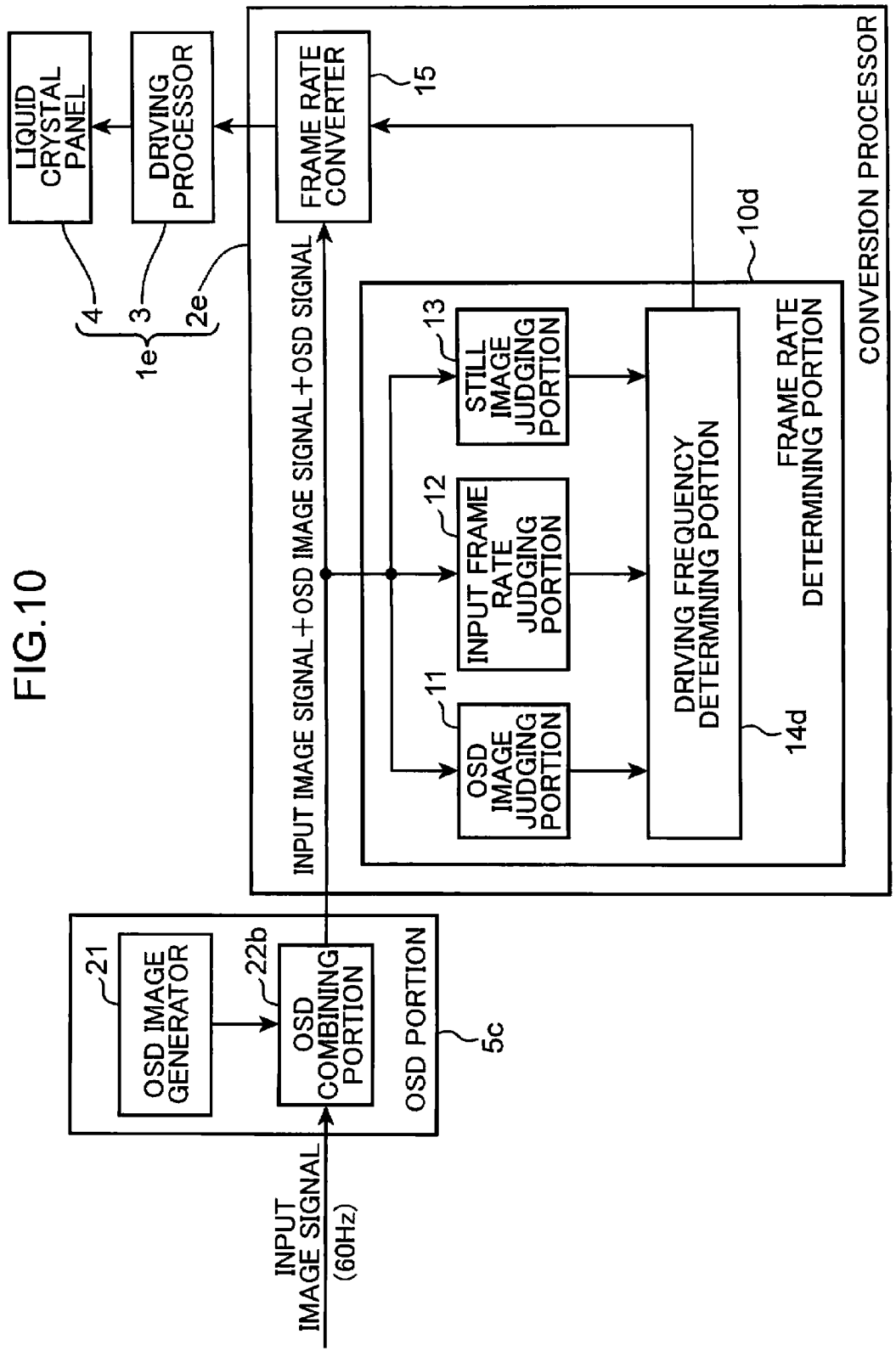
FIG. 10 is a block diagram showing a configuration of a display device including the sixth embodiment of the display control device and a configuration of an OSD portion.

FIG. 10 is a block diagram showing a configuration of a display device including the sixth embodiment of the display control device and a configuration of an OSD portion. In FIG. 10, the same components as the components shown in FIG. 1 are denoted by the same reference symbols. A display device 1e shown in FIG. 10 includes a conversion processor 2e, which is the sixth embodiment of the display control device, instead of the conversion processor 2 in the display device 1 shown in FIG. 1. In the following description of the sixth embodiment, differences from the first embodiment are mainly described.

An OSD portion 5c shown in FIG. 10 includes an OSD image generator 21 and an OSD combining portion 22b. The OSD combining portion 22b generates an OSD signal including a YS signal and a signal representing information about a frame rate of an OSD image generated by the OSD image generator 21. The OSD combining portion 22b outputs the generated OSD signal to the conversion processor 2e.

In this embodiment, when a signal indicating that the OSD image is a moving image is input from the still image judging portion 13, a driving frequency determining portion 14d determines 240 Hz as a determined frame rate. Consequently, display quality of the moving image is improved. When a signal indicating that the OSD signal is a still image is input from the still image judging portion 13, the driving frequency determining portion 14d determines 30 Hz as the determined frame rate. Consequently, power consumption is reduced. When switching the frame rate between 240 Hz and 30 Hz, the driving frequency determining portion 14d gradually switches the frame rate over frames as in the first embodiment. Consequently, flicker is prevented from occurring in a displayed image of the liquid crystal panel 4.

When the OSD signal output from the OSD combining portion 22b indicates that the frame rate of the OSD image is higher than the present frame rate, the driving frequency determining portion 14d determines a double frame rate of the frame rate of the OSD image as the determined frame rate. Note that, in the sixth embodiment, as in the embodiments described above, the frame rate of the input image signal is set to 60 Hz. In this embodiment, a frame rate determining portion 10d is exemplified as the determining portion and the frame rate converter 15 is exemplified as the converter.

Figure 11:
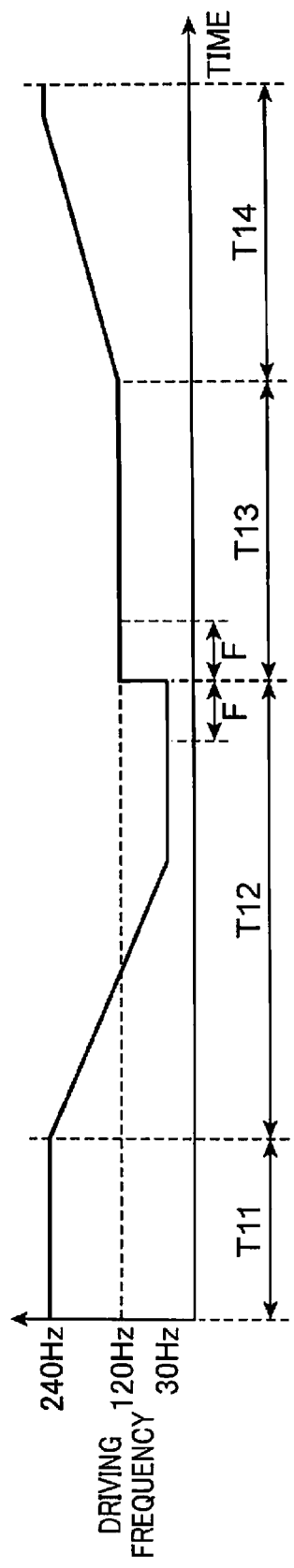
FIG. 11 is a timing chart schematically showing driving frequencies when the frame images in FIGS. 2A to 2D are displayed in the sixth embodiment.

FIG. 11 is a timing chart schematically showing driving frequencies (frame rates) at the time when the frame images shown in FIGS. 2A to 2D are displayed in the sixth embodiment. In FIG. 11, a period is divided into periods T11 to T14 in order according to the frame images displayed on the liquid crystal panel 4. The operation of the conversion processor 2e shown in FIG. 10 is described with reference to FIG. 2, FIG. 10, and FIG. 11.

In FIG. 11, in the first period T11, the moving image shown in FIG. 2A is displayed on the liquid crystal panel 4. In this case, the driving frequency determining portion 14d determines 240 Hz as a determined frame rate. In this embodiment, since the frame rate of the input image signal is 60 Hz, the frame rate converter 15 generates a signal representing an interpolated frame image obtained by interpolating frame images based on the input image signals and outputs the signal to the driving processor 3. In the period T11, as shown in FIG. 11, the frame rate is maintained at 240 Hz. Consequently, display quality of the moving image is improved compared with the case of FIG. 3.

In the period T12 following the period T11, the still image shown in FIG. 2B is displayed on the liquid crystal panel 4. In this case, in order to reduce power consumption, the driving frequency determining portion 14d determines 30 Hz as the determined frame rate. In order to prevent flicker from occurring in a displayed image, the driving frequency determining portion 14d determines the frame rate to gradually decrease over frames from 240 Hz to 30 Hz as shown in FIG. 11. The frame rate converter 15 generates, according to the frame rate determined to gradually decrease by the driving frequency determining portion 14d, a signal representing an interpolated frame image obtained by interpolating the input image signals and outputs the signal to the driving processor 3. Therefore, in the period T12, as shown in FIG. 11, the frame rate gradually decreases from 240 Hz. When decreasing to 30 Hz, the frame rate is maintained at 30 Hz.

In the period T13 following the period T12, as shown in FIG. 2C, an image obtained by on-screen displaying the moving OSD image 24 on the still image is displayed on the liquid crystal panel 4. In this case, when an OSD signal indicating that the frame rate of the OSD image is 60 Hz is output from the OSD combining portion 22b, the driving frequency determining portion 14d determines 120 Hz, which is a double of the frame rate of the OSD image, as the determined frame rate. The driving frequency determining portion 14d instantaneously switches the determined frame rate without gradually increasing the determined frame rate. That is, the driving frequency determining portion 14d determines 120 Hz as the determined frame rate in a first frame F in the period T13 following a last frame F in the period T12. In the sixth embodiment, since both of the frame rate of the input image signal and the frame rate of the OSD image are 60 Hz, the frame rate converter 15 generates an interpolated frame image obtained by interpolating the input image signals and the OSD image signals, generates a signal representing a frame image including the generated interpolated frame image, and outputs the signal to the driving processor 3. In the period T13, as shown in FIG. 11, the frame rate is maintained at 120 Hz.

In the period T14 following the period T13, the moving image shown in FIG. 2D is displayed on the liquid crystal panel 4. In this case, the driving frequency determining portion 14d determines 240 Hz as the determined frame rate. In order to prevent flicker from occurring in a displayed image, as shown in FIG. 11, the driving frequency determining portion 14d gradually switches the determined frame rate to gradually increase over frames from 120 Hz to 240 Hz. The frame rate converter 15 generates, according to the determined frame rate determined to gradually increase by the driving frequency determining portion 14d, a signal representing an interpolated frame image obtained by interpolating the input image signals and outputs the signal to the driving processor 3. Therefore, in the period T14, as shown in FIG. 11, the frame rate is gradually increased from 120 Hz and, when increasing to 240 Hz, is maintained at 240 Hz.

As described above, in the sixth embodiment, when the OSD signal output from the OSD combining portion 22b indicates that the frame rate of the on-screen displayed OSD image is higher than the present frame rate and the OSD image is a moving image, the driving frequency determining portion 14d instantaneously switches the present frame rate and determines a double frame rate of the frame rate of the OSD image as the determined frame rate. Therefore, an image is displayed at the double frame rate of the frame rate of the OSD image starting from the next frame image. As a result, in the sixth embodiment, as in the embodiments described above, a smoothly moving OSD image may be on-screen displayed.

Note that, in the sixth embodiment, the driving frequency determining portion 14d determines the double frame rate of the frame rate of the OSD image as the determined frame rate. However, the conversion processor is not limited to this. For example, the driving frequency determining portion 14d may determine a triple or quadruple frame rate of the frame rate of the OSD image as the determined frame rate. That is, the driving frequency determining portion 14d only has to determine an integer multiple of the frame rate of the OSD image as the determined frame rate.

(Others)

In the embodiments described above, the driving frequency determining portion 14 and the like instantaneously switch the determined frame rate and display the OSD image at the determined frame rate starting from the next frame image of the frame image currently displayed on the liquid crystal panel 4. Alternatively, the driving frequency determining portion 14 and the like do not have to instantaneously switch the determined frame rate. The driving frequency determining portion 14 and the like may switch the determined frame rate after K frames (K is a positive integer) such that the OSD image is displayed at the determined frame rate starting from, for example, a frame image after the K frames. A case of K=1 is equivalent to the embodiments described above. Note that, if K is, for example, an integer not more than 10, a delay of switching from the present frame rate to the determined frame rate is not conspicuous for a user. Therefore, K is preferably an integer not less than 1 and not more than 10.

In the embodiments described above, when the on-screen displayed OSD image is a non-moving image, even if the frame rate (e.g., 60 Hz) of the OSD image is higher than the present frame rate (e.g., 30 Hz), the driving frequency determining portion 14 and the like may determine the present frame rate as the determined frame rate. Since the OSD image does not move, display quality of the OSD image is not deteriorated even if the present frame rate is maintained. Consequently, power consumption may be reduced without deteriorating the display quality of the OSD image.

In the embodiments described above, even when the on-screen displayed OSD image is a non-moving image, when the frame rate (e.g., 60 Hz) of the OSD image is higher than the present frame rate (e.g., 30 Hz), the driving frequency determining portion 14 and the like may determine to increase the frame rate to the frame rate of the OSD image. Consequently, the OSD image may be displayed on the liquid crystal panel 4 at the frame rate of the OSD image.

In the embodiments described above, the driving frequency determining portion 14 and the like may change the determined frame rate according to a size of the on-screen displayed OSD image. For example, when the size of the OSD image is not greater than a predetermined value (e.g., 5% of a size of the liquid crystal panel 4), even if the frame rate (e.g., 60 Hz) of the OSD image is higher than the present frame rate (e.g., 30 Hz), the driving frequency determining portion 14 and the like may determine the present frame rate as the determined frame rate. When the size of the OSD image is small, deterioration in the display quality of the OSD image is not conspicuous even if the present frame rate is maintained. As a result, a display device may give priority to a reduction in power consumption.

In the embodiments described above, even when the input image signal represents a moving image, the still image judging portion 13 may determine that the input image signal represents a still image when a moving amount is small. For example, if a state in which an average of moving amounts in the horizontal direction of an entire display screen of the liquid crystal panel 4 is not more than ten pixels and an average of moving amounts in the vertical direction is not more than ten pixels between preceding and succeeding frames continue for sixty frame periods, the still image judging portion 13 may determine that the input image signal represents a still image.

In the first to fourth and sixth embodiments, when a moving amount of the OSD image is small, the OSD image judging portion 11 may determine that the OSD image is a non-moving image. For example, if a moving amount in the horizontal direction of the OSD image is less than ten pixels and a moving amount in the vertical direction of the OSD image is less than ten pixels between preceding and succeeding frames, the OSD image judging portion 11 may determine that the OSD image is a non-moving image. In other words, if the moving amount in the horizontal direction of the OSD image is not less than ten pixels or the moving amount in the vertical direction of the OSD image is not less than ten pixels, the OSD image judging portion 11 may determine that the OSD image is a moving image.

The display devices 1 and 1a to 1e include the liquid crystal panel 4 as the display portion. However, the display portion is not limited to this. The display devices 1 and 1a to 1e may include, for example, an organic EL panel as the display portion. The display portion only has to be, for example, a display portion in which power consumption decreases when a frame rate in displaying a frame image is reduced.

Note that inventions including configurations described below are mainly included in the specific embodiments described above.

A display control device according to an aspect of the present invention is a display control device which controls display of a frame image on a display portion which displays the frame image, the frame image including an input image based on an input image signal and an OSD image for on-screen display, the display control device comprising: a determining portion which determines a frame rate in displaying the frame image on the display portion as a determined frame rate; and a converter which converts a present frame rate into the determined frame rate when the determined frame rate is different from the present frame rate, wherein the determining portion: acquires information about the OSD image; determines whether the determined frame rate is set to a frame rate identical to the present frame rate or a frame rate higher than the present frame rate, based on the acquired information about the OSD image; and when determining that the determined frame rate is set to the frame rate higher than the present frame rate, determines the frame rate as the determined frame rate to display the frame image on the display portion at the determined frame rate starting from a frame image which is K frames after a frame image currently displayed on the display portion, where K is an integer not less than 1 and not more than 10.

With this configuration, the frame rate in displaying the frame image on the display portion is determined as the determined frame rate by the determining portion. When the determined frame rate is different from the present frame rate, the present frame rate is converted into the determined frame rate by the converter. It is determined by the determining portion based on the information about the OSD image whether the determined frame rate is set to a frame rate identical to the present frame rate or a frame rate higher than the present frame rate. Therefore, the determined frame rate may be determined as a frame rate appropriate for the OSD image. When the determining portion determines to set the determined frame rate to a frame rate higher than the present frame rate, the determined frame rate is determined by the determining portion to display the frame image at the determined frame rate starting from a frame image that is K frames after a frame image currently displayed on the display portion, where K is an integer not less than 1 and not more than 10. As a result, the OSD image is on-screen displayed on the display portion at the determined frame rate appropriate for the OSD image starting from the frame image K frames after. Therefore, deterioration in display quality of the OSD image may be suppressed.

In the display control device described above, the information about the OSD image may include information about an OSD frame rate which is a frame rate in displaying the OSD image. When the information about the OSD image includes information indicating that the OSD frame rate is higher than the present frame rate, the determining portion may determine to set the determined frame rate to a frame rate which is N-times as great as the OSD frame rate, where N is an integer not less than 1.

With this configuration, the information of the OSD frame rate, which is the frame rate in displaying the OSD image, is included in the information about the OSD image. When the information about the OSD image includes the information indicating that the OSD frame rate is a value higher than the present frame rate, it is determined by the determining portion to set the determined frame rate to a frame rate that is N-times as great as the OSD frame rate. Therefore, the OSD image may be suitably on-screen displayed on the display portion at the frame rate that is N-times as great as the OSD frame rate.

In the display control device described above, when the information about the OSD image includes information indicating that the OSD frame rate is not higher than the present frame rate, the determining portion may determine to set the determined frame rate to a frame rate identical to the present frame rate.

With this configuration, when the information about the OSD image includes the information indicating that the OSD frame rate is a value not higher than the present frame rate, it is determined by the determining portion to set the determined frame rate to a frame rate identical to the present frame rate. Since the OSD frame rate is not higher than the present frame rate, the OSD image may be suitably on-screen displayed on the display portion at the present frame rate.

In the display control device described above, the information about the OSD image may further include information indicating whether or not the OSD image is a moving image. When the information about the OSD image includes information indicating that the OSD frame rate is higher than the present frame rate and includes information indicating that the OSD image is a moving image, the determining portion may determine to set the determined frame rate to a frame rate which is N-times as great as the OSD frame rate, where N is an integer not less than 1.

With this configuration, the information indicating whether or not the OSD image is a moving image is further included in the information about the OSD image. When the information about the OSD image includes the information indicating that the OSD frame rate is a value higher than the present frame rate and includes the information indicating that the OSD image is a moving image, it is determined by the determining portion to set the determined frame rate to the frame rate that is N-times as great as the OSD frame rate. Therefore, the OSD image, which is the moving image, may be suitably on-screen displayed on the display portion at the frame rate that is N-times as great as the OSD frame rate starting from the frame image after the K frames.

In the display control device described above, when the information about the OSD image includes information indicating that the OSD image is not a moving image, the determining portion may determine to set the determined frame rate to a frame rate identical to the present frame rate irrespective of whether the OSD frame rate is high or low.

With this configuration, when the information about the OSD image includes the information indicating that the OSD image is not a moving image, it is determined by the determining portion to set the determined frame rate to a frame rate identical to the present frame rate irrespective of whether the OSD frame rate is high or low. Since the OSD image is not a moving image, the OSD image may be suitably on-screen displayed on the display portion even at the present frame rate.

In the display control device described above, the information about the OSD image may include an OSD signal representing a display region of the OSD image in the display portion. The determining portion may include an OSD image judging portion which judges whether or not the OSD image is a moving image, based on the OSD signal. When the OSD image judging portion judges that the OSD image is not a moving image, the determining portion may determine to set the determined frame rate to a frame rate identical to the present frame rate.

With this configuration, the OSD signal indicating the display region of the OSD image in the display portion is included in the information about the OSD image. It is judged by the OSD image judging portion based on the OSD signal whether or not the OSD image is a moving image. When the OSD image judging portion judges that the OSD image is not a moving image, it is determined by the determining portion to set the determined frame rate to a frame rate identical to the present frame rate. Since the OSD image is not a moving image, the OSD image may be suitably on-screen displayed on the display portion at the present frame rate.

The display control device described above may further include a photographing portion which photographs an observer who observes the display portion. The determining portion may include a photographing information judging portion which judges information about the observer based on a photographing result of the photographing portion. The photographing information judging portion may judge, as the information about the observer, whether or not time during which the observer does not view the display portion continues for not less than a predetermined time, or, whether or not the observer is away from the display portion by not less than a predetermined distance. When the photographing information judging portion judges that the time during which the observer does not view the display portion continues for not less than the predetermined time, or the photographing information judging portion judges that the observer is away from the display portion by not less than the predetermined distance, the determining portion may determine to set the determined frame rate to a frame rate identical to the present frame rate irrespective of the information about the OSD image.

With this configuration, the information about the observer is determined by the photographing information judging portion based on the photographing result of the photographing portion which photographs the observer who observes the display portion. As the information about the observer, it is judged by the photographing information judging portion whether or not the time during which the observer does not view the display portion continues for not less than the predetermined time, or, whether or not the observer is away from the display portion by not less than the predetermined distance. When it is judged by the photographing information judging portion that the time during which the observer does not view the display portion continues for not less than the predetermined time, or that the observer is away from the display portion by not less than the predetermined distance, it is determined by the determining portion to set the determined frame rate to a frame rate identical to the present frame rate. In these cases, viewing the display portion is not considered to be the main activity of the observer. Therefore, even if it is determined to set the determined frame rate to a frame rate identical to the present frame rate, deterioration in display quality of the on-screen displayed OSD image is hardly conspicuous for the observer.

The display control device described above may further include a battery which supplies electric power to respective portions of the device. The determining portion may include a residual amount judging portion which judges a residual amount of the battery. When the residual amount judging portion judges that the residual amount of the battery is not more than a predetermined value, the determining portion may determine to set the determined frame rate to a frame rate identical to the present frame rate irrespective of the information about the OSD image.

With this configuration, the electric power is supplied to the respective portions of the device from the battery. The residual amount of the battery is judged by the residual amount judging portion. When it is judged by the residual amount judging portion that the residual amount of the battery is not more than the predetermined value, it is determined by the determining portion to set the determined frame rate to a frame rate identical to the present frame rate. Since the determined frame rate is not set to a frame rate higher than the present frame rate, the residual amount of the battery may be prevented from more quickly decreasing.

A display control method according to an aspect of the present invention is a display control method for controlling display of a frame image on a display portion which displays the frame image, the frame image including an input image based on an input image signal and an OSD image for on-screen display, the display control method comprising: a first step of determining a frame rate in displaying the frame image on the display portion as a determined frame rate; and a second step of converting a present frame rate into the determined frame rate when the determined frame rate is different from the present frame rate, wherein the first step includes: an acquiring step of acquiring information about the OSD image; and a determining step of determining whether the determined frame rate is set to a frame rate identical to the present frame rate or a frame rate higher than the present frame rate, based on the acquired information about the OSD image, and wherein in the first step, when it is determined in the determining step that the determined frame rate is set to the frame rate higher than the present frame rate, the frame rate is determined as the determined frame rate to display the frame image on the display portion at the determined frame rate starting from a frame image which is K frames after a frame image currently displayed on the display portion, where K is an integer not less than 1 and not more than 10.

With this configuration, in the first step, the frame rate in displaying the frame image on the display portion is determined as the determined frame rate. In the second step, when the determined frame rate is different from the present frame rate, the present frame rate is converted into the determined frame rate. In the acquiring step, information about the OSD image is acquired. In the determining step, it is determined based on the information about the OSD image whether the determined frame rate is set to a frame rate identical to the present frame rate or a frame rate higher than the present frame rate. When it is determined in the determining step to set the determined frame rate to a frame rate higher than the present frame rate, in the first step, the frame rate is determined as the determined frame rate to display the frame image at the determined frame rate starting from a frame image that is K frames after a frame image currently displayed on the display portion, where K is an integer not less than 1 and not more than 10. Therefore, the OSD image is on-screen displayed on the display portion at the determined frame rate appropriate for the OSD image starting from the frame image that is K frames after the currently displayed frame image. Thus, deterioration in display quality of the OSD image may be suppressed.

INDUSTRIAL APPLICABILITY

In a display control device which controls display of a frame image on a display portion which displays the frame image, the frame image including an input image based on an input image signal and an OSD image for on-screen display, the present invention is useful as a display control device and a display control method for making it possible to cause little deterioration in display quality of an on-screen displayed image.

The invention claimed is:

1. A display control device which controls display of a frame image on a display portion which displays the frame image, the frame image including an input image based on an input image signal and an OSD image for on-screen display, the display control device comprising:
   a processor configured to function at least as:
   a determining portion which is electrically connected to outside of the display control device by a signal line, to which the input image signal and an OSD image signal representing the OSD image are input via the signal line, and which is configured to determine a frame rate in displaying the frame image on the display portion as a determined frame rate; and
   a converter which is electrically connected to the determining portion and the display portion, to which the input image signal and the OSD image signal are input, and which is configured to convert a present frame rate into the determined frame rate when the determined frame rate is different from the present frame rate, wherein
   the determining portion is configured to:
   acquire information about the OSD image;
   determine whether the determined frame rate is set to a frame rate identical to the present frame rate or a frame rate higher than the present frame rate, based on the acquired information about the OSD image; and
   when determiningthat the determined frame rate is set to the frame rate higher than the present frame rate, determine the frame rate as the determined frame rate to display the frame image on the display portion at the determined frame rate starting from a frame image which is K frames after a frame image currently displayed on the display portion, where K is an integer not less than 1 and not more than 10,
   the information about the OSD image includes information about an OSD frame rate which is a frame rate in displaying the OSD image, and
   when the information about the OSD image includes information indicating that the OSD frame rate is higher than the present frame rate, the determining portion is configured to determine to set the determined frame rate to a frame rate which is N-time as great as the OSD frame rate, where N is an integer not less than 1.

2. The display control device according to claim 1, wherein, when the information about the OSD image includes information indicating that the OSD frame rate is not higher than the present frame rate, the determining portion determines to set the determined frame rate to a frame rate identical to the present frame rate.

3. The display control device according to claim 1, wherein
   the information about the OSD image further includes information indicating whether or not the OSD image is a moving image, and
   when the information about the OSD image includes information indicating that the OSD frame rate is higher than the present frame rate and includes information indicating that the OSD image is a moving image, the determining portion determines to set the determined frame rate to a frame rate which is N-times as great as the OSD frame rate, where N is an integer not less than 1.

4. The display control device according to claim 3, wherein, when the information about the OSD image includes information indicating that the OSD image is not a moving image, the determining portion determines to set the determined frame rate to a frame rate identical to the present frame rate irrespective of whether the OSD frame rate is high or low.

5. The display control device according to claim 1, wherein
   the information about the OSD image includes an OSD signal representing a display region of the OSD image in the display portion,
   the determining portion includes an OSD image judging portion which is electrically connected to outside of the display control device by a signal line, to which the input image signal, the OSD image signal, and the OSD signal are input via the signal line, and which is configured to judge whether or not the OSD image is a moving image, based on the OSD signal, and
   when the OSD image judging portion judges that the OSD image is not a moving image, the determining portion is configured to determine to set the determined frame rate to a frame rate identical to the present frame rate.

6. The display control device according to claim 1, wherein the processor is further configured to function as:
   a photographing portion which photographs an observer who observes the display portion; and
   a photographing information judging portion which judges information about the observer based on a photographing result of the photographing portion, wherein
   the photographing information judging portion judges, as the information about the observer, whether or not time during which the observer does not view the display portion continues for not less than a predetermined time, or, whether or not the observer is away from the display portion by not less than a predetermined distance, and
   when the photographing information judging portion judges that the time during which the observer does not view the display portion continues for not less than the predetermined time, or the photographing information judging portion judges that the observer is away from the display portion by not less than the predetermined distance, the determining portion determines to set the determined frame rate to a frame rate identical to the present frame rate irrespective of the information about the OSD image.

7. The display control device according to claim 1, further comprising a battery which supplies electric power at least to processor, wherein
   the determining portion includes a residual amount judging portion which judges a residual amount of the battery, and
   when the residual amount judging portion judges that the residual amount of the battery is not more than a predetermined value, the determining portion determines to set the determined frame rate to a frame rate identical to the present frame rate irrespective of the information about the OSD image.

8. A display control method for controlling display of a frame image on a display portion which displays the frame image, the frame image including an input image based on an input image signal and an OSD image for on-screen display, the display control method comprising:
   a first step of determining a frame rate in displaying the frame image on the display portion as a determined frame rate; and
   a second step of converting a present frame rate into the determined frame rate when the determined frame rate is different from the present frame rate, wherein the first step includes:
- an acquiring step of acquiring information about the OSD image; and
- a determining step of determining whether the determined frame rate is set to a frame rate identical to the present frame rate or a frame rate higher than the present frame rate, based on the acquired information about the OSD image, wherein in the first step, when it is determined in the determining step that the determined frame rate is set to the frame rate higher than the present frame rate, the frame rate is determined as the determined frame rate to display the frame image on the display portion at the determined frame rate starting from a frame image which is K frames after a frame image currently displayed on the display portion, where K is an integer not less than 1 and not more than 10, wherein the information about the OSD image includes information about an OSD frame rate which is a frame rate in displaying the OSD image, and wherein in the first step, when the information about the OSD image includes information indicating that the OSD frame rate is higher than the present frame rate, it is determined to set the determined frame rate to a frame rate which is N-time as great as the OSD frame rate, where N is an integer not less than 1.

* * * * *